July 21, 1970   R. A. HEMSTREET   3,521,457
APPARATUS FOR MAKING HYDROGEN SLUSH USING NITROGEN
AND HELIUM REFRIGERANTS
Filed July 19, 1967   2 Sheets-Sheet 1
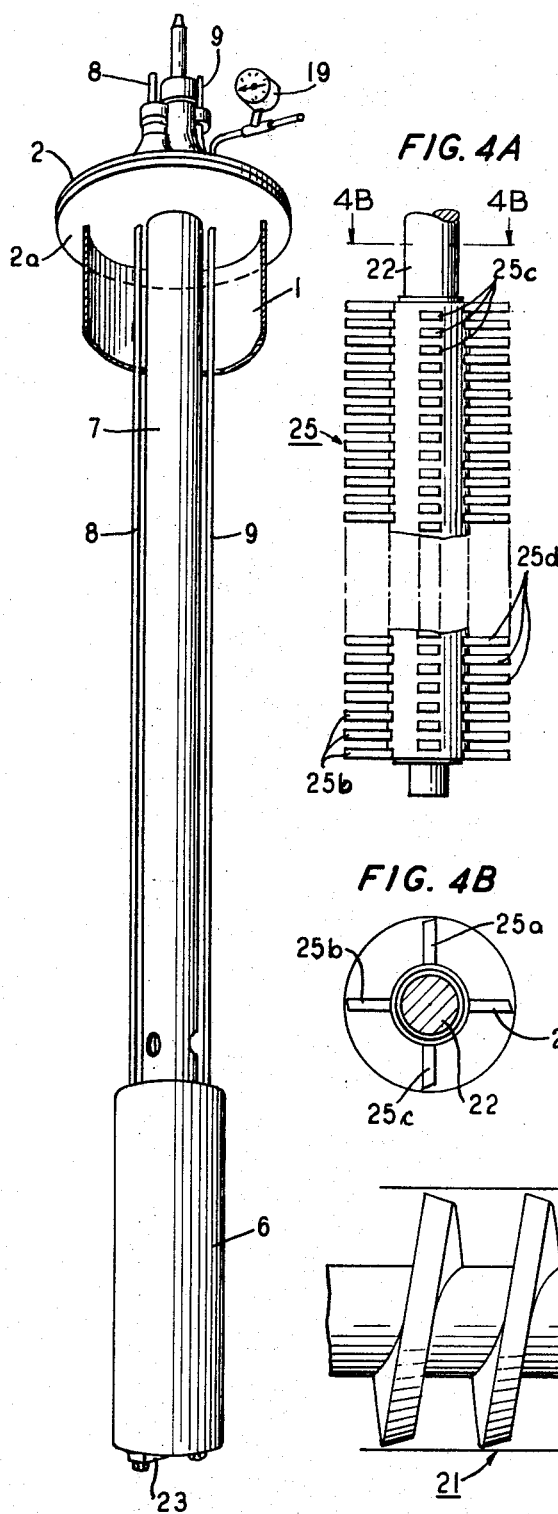
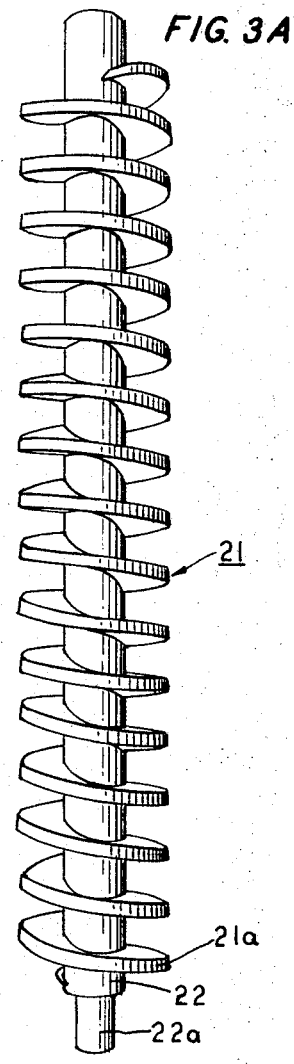
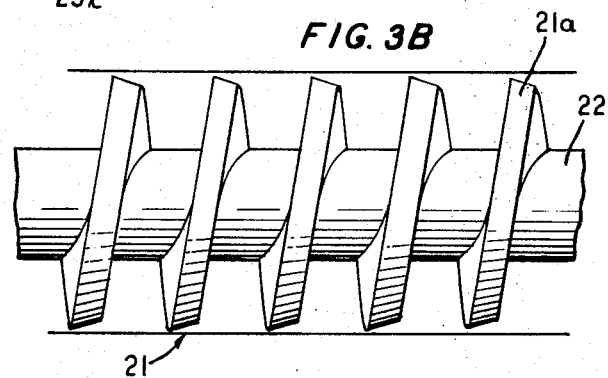
INVENTOR
R. A. HEMSTREET
BY Francis B. Henry
ATTORNEY

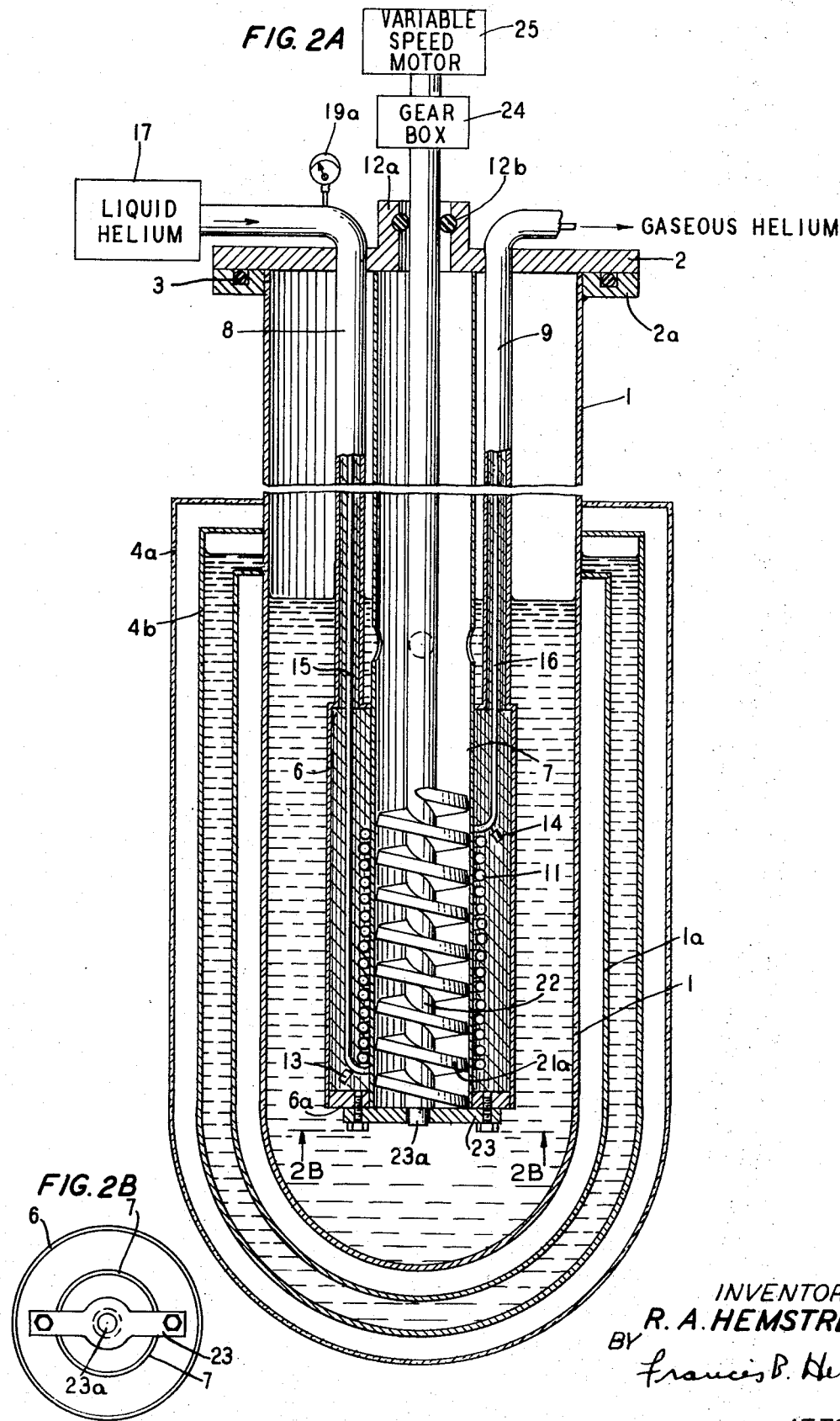

United States Patent Office 3,521,457
Patented July 21, 1970

3,521,457
APPARATUS FOR MAKING HYDROGEN SLUSH USING NITROGEN AND HELIUM REFRIGERANTS
Russell A. Hemstreet, Mountainside, N.J., assignor to Air Reduction Company, Incorporated, New York, N.Y., a corporation of New York
Filed July 19, 1967, Ser. No. 654,419
Int. Cl. F25j 1/00
U.S. Cl. 62—45                        3 Claims

ABSTRACT OF THE DISCLOSURE

Process and apparatus for treating hydrogen and other low temperature fluids to form slush. This includes a slush generator wherein the supply of liquid or gas is introduced into the inner chamber of a heat exchanger which is maintained by separate refrigeration means at a temperature below the triple point of the supply fluid. The frozen layer formed on the extended inner surface of the inner chamber is continuously scraped off in the form of powder by rotation of a composite mechanical blade. A semi-solid slush is thus formed which is forced out of the device by the flushing action of the liquid and the pumping action of the blade which may be in the form of a screw.

CROSS REFERENCE TO RELATED APPLICATIONS

Application filed by Russell A. Hemstreet, Howard K. Hover, and Derk Th. A. Huibers, at even date herewith as Ser. No. 654,455.

BACKGROUND OF INVENTION

This invention relates in general to techniques and apparatus for forming slush from low temperature fluids; and more particularly, to the formation of hydrogen slush.

Slush hydrogen, which is an intimate mixture of liquid and solid hydrogen, is of particular interest to the aerospace industry as a potential fuel or working fluid in rocket engines and in supersonic aircraft. The advantages of slush hydrogen over normal boiling liquid for such purposes are the greater density and larger refrigeration capacity of the former.

The traditional prior art method employed for preparing slush hydrogen has been by the vacuum method, in which liquid hydrogen is adiabatically evaporated to the triple point, producing a liquid-solid mixture.

The traditional prior art vacuum method has been found to have certain disadvantages, including the following:

(1) At the reduced operational pressures, the problem of air leak is present, to an aggravated degree in large scale operations, increasing an ever present danger of explosion.

(2) By its nature, the prior art vacuum method is not adapted to continuous production.

(3) In prior art vacuum systems, the chunks of solid are of relatively large dimension and low density and must be broken up mechanically and aged up to three hours to provide particles which have satisfactory flow and packing characteristics.

(4) Part of the product is lost in producing the refrigeration needed for the vacuum process.

SUMMARY OF INVENTION

It is the object of the present invention to provide an improved method for forming slush from low temperature fluids and more particularly hydrogen, wherein the foregoing disadvantages are largely eliminated.

This is accomplished in accordance with the present invention by reducing the subject supply fluid to slush at ambient or higher pressure, the latter being maintained by a supplementary gas pressurizing system. The needed refrigeration is indirectly supplied to the system by means of an auxiliary closed-cycle refrigerant. The refrigerant passes through an outer chamber surrounding and cooling an extended heat transfer surface in an inner chamber, to below the triple point of the supply fluid, causing the latter to solidify on the chamber's inner walls. The whole system is heat-insulated in a Dewar-type container. A mechanical scraper rotates in the inner chamber, bearing against the solidified layer and continuously scraping off the solid in the form of powder, which is continuously expelled from the bottom of the vessel. In one embodiment, the mechanical scraper blade is helically wound about the central shaft in the form of a screw. An alternative embodiment comprises rake-like rows of laterally-projecting blades arranged in the form of teeth machined into two pairs of plates mounted at right angles to one another along the central shaft. The teeth of one pair of plates are in off-set relation to the teeth of the other pair, so that each spot on the inner chamber is scraped twice per revolution of the shaft.

In the apparatus for forming hydrogen slush, refrigeration is supplied by liquid helium or cold gaseous helium passing through the outer chamber under slight pressure.

It is anticipated that in addition to hydrogen, the techniques and apparatus of the present invention can be successfully applied to other low temperature fluids. Examples are oxygen, fluorine and methane.

The following advantages over the prior art vacuum-type systems are realized by the techniques and apparatus of the present invention for manufacturing low temperature slush and particularly hydrogen slush:

(1) At ambient or higher pressures, at which the system of the present invention operates, there are no problems with air leaks, thus decreasing the danger of explosion. (Although the pressure of hydrogen at its freezing temperature is only 0.069 atmosphere, the operation in accordance with the present invention is carried out at atmospheric pressure or higher by pressurizing with an auxiliary gas, such as helium.)

(2) The system of the present invention has been found to be intrinsically ideal for continuous production of slush.

(3) The quality of the slush product is improved, in that the density of the solids and the percentage-by-weight of solids is substantially greater than in the case of slush produced with prior art vacuum methods.

(4) The loss of product in the system and process of the present invention is eliminated as contrasted to the prior-art vacuum process, in which part of the hydrogen is consumed in producing refrigeration and in aging to make the product flowable.

(5) The method of the present invention is readily adaptable to large scale production.

These and other objects, features, and advantages of the invention will be apparent to those skilled in the art from a study of the specification hereinafter with reference to the attached drawings.

BRIEF DESCRIPTION OF THE DRAWINGS

FIG. 1 is a perspective showing of an embodiment of the slush generator unit of the present invention, with the Dewar-type container removed;

FIG. 2A is a longitudinal section of the generator unit of FIG. 1, enclosed in a Dewar-type container, and coupled with schematic showings of supply and storage means for a slush-making system in accordance with the present invention.

FIG. 2B is a partial cross-sectional showing of the lower end of the generator of FIG. 2A inside of the Dewar-type container;

FIG. 3A is an enlarged showing, in perspective of the screw-type scraper indicated in FIG. 2A.

FIG. 3B is an enlarged side view of a portion of the screw-type scraper of FIG. 3A;

FIG. 4A is an enlarged showing, in perspective, of an alternative form of the scraper of FIGS. 3A, 3B; and FIG. 4B is a cross-sectional showing through the plane indicated by the arrows 4B—4B of FIG. 4A.

DESCRIPTION OF PREFERRED EMBODIMENTS OF THE INVENTION

From a purely theoretical standpoint, the production of slush from low temperature fluids, particularly hydrogen, by the method of indirect refrigeration, appears to be fairly straight-forward. Taking hydrogen as an example, the liquid is partially frozen on the extended inner surface of a heat exchanger, which has been cooled by closed cycle refrigeration employing liquid or cold gaseous helium to a temperature below the hydrogen triple point. The solid hydrogen is subsequently removed from the heat exchanger surface in the form of particles by the scraping action of a sharp edged mechanical member which is disposed to contact each portion of the surface periodically. The pulverized solid particles are continuously forced out by the flushing action of the surrounding liquid and the pumping action of the mechanical scraper.

Whereas there has never been any doubt that low temperature fluids, such as hydrogen, could be frozen onto a surface which was sufficiently cooled, substantial problems arise in the removal and reduction of the frozen layer to particles of the proper size and density for the formation of slush, since very little information is available as to the characteristics of solids in this very low temperature range. For example, little prior art information is available as to the consistency of solid hydrogen, that is, whether it is a hard, brittle solid or rather soft, plastic and putty-like, indications in the literature being that the latter is the case. It will be apparent to those skilled in the art that a solid of soft, gummy consistency could be expected to be so troublesome as to make a scraped heat exchanger, of the type herein contemplated, practically inoperative.

Therefore, in accordance with my invention, I have carried out certain experiments to demonstrate the feasibility of using indirect refrigeration in a scraped heat exchanger to produce slush hydrogen. These experiments had as their principal objectives the following:

(1) To operate a scraped heat exchanger to determine whether solid hydrogen could be removed from the heat exchanger surface without clogging or jamming the scraper.

(2) To determine whether solid hydrogen would readily exit from the heat exchanger.

(3) To determine whether solid hydrogen could be removed from the heat exchanger surface in the form of small particles suitable for the formation of slush hydrogen.

(4) To determine the general order of magnitude of the work required to remove solid hydrogen from the heat exchanger surface.

FIG. 1 of the drawings shows, in perspective, one embodiment of a slush generator in accordance with the present invention with the cryostat container removed to show the internal structure. The longitudinal section of FIG. 2A, is a showing of the interior of the same embodiment of the slush generator of FIG. 1, disposed within the Dewar-type container.

In combination with the embodiment shown, the cryostat container can assume any form well-known in the art for producing the necessary low temperature environment, such as a container of the general form disclosed in Figure 3.3 of Low Temperature Techniques, A. C. Rose-Innes, published by the English Universities Press, Ltd., London, England, 1964.

In the disclosed embodiment, the inner vessel 1 is of Pyrex glass constructed to withstand liquid helium temperatures. It is five inches in inner diameter and 45 inches long, terminating at the lower end in a hemispherical bulb and closed at the upper end in a manner to be described. To a height several feet above the closed end, vessel 1 is surrounded by a Dewar-type insulating jacket 1a, providing a spacing about one-half inch wide between the walls, which is evacuated. Surrounding wall 1a is an additional double-walled Dewar-type insulating jacket 4a, 4b, about nine inches in outer diameter, providing an external vacuum jacket about one-half inch wide between walls 4a, 4b. The space between the inner wall 4b of the external insulating container and the outer wall 1a of the inner vessel is filled with liquid nitrogen which is introduced several hours before the cryostat is used, to cool it down. Both the double-walled inner vessel 1, 1a, and the double-walled outer vessel 4a, 4b are unsilvered for visibility. The Dewar-type container rests on supporting means, not shown.

The inner vessel 1 is vacuum-sealed at its upper periphery, fitting against the inwardly directed annular flange 2a of a brass cover about eight inches in diameter and one-half inch thick. One or more O-rings, such as 3, are employed to form a vacuum tight junction. Details of a vacuum tight closure which may be employed are shown in Figure 3.4 on page 28 of Low Temperature Techniques, A. C. Rose-Innes, supra.

Axially centered inside of the glass tubular container 1 is an annular vacuum jacket 6 of some metal suited to cryogenic application. In the present example the jacket 6 comprises a stainless steel pipe one-sixteenth of an inch thick, 12 inches long, and three and one-half inches in outer diameter. Axially centered in the vacuum jacket 6 is a smaller pipe 7 of stainless steel one-sixteenth of an inch thick, 45 inches long, in the present example, and having an outer diameter one and seven-eighths inches. The annular vacuum space between the pipes 6 and 7 is closed at the bottom, through a plane about 6 inches from the bottom of the glass container 1, by means of an annular plate 6a which is ¼ of an inch thick, 3½ inches in outer diameter, and 1⅞ inches in inner diameter, which is sealed into place in a vacuum tight seal.

The upper end of the vacuum jacket, comprising the space between tubes 6 and 7, is closed except for a pair of upwardly protruding tubes 8 and 9, also of stainless steel .020 inch thick, which are ½ inch in inner diameter, and long enough to protrude through hermetical seals in the top of the cover 2.

The stainless steel tube 7 which serves as the inner tube of a heat exchanger is wrapped along its cylindrical periphery with a refrigeration coil 11 comprising 14 turns of ¼ inch inner diameter copper tubing (.032 inch thick), each of the turns being spaced ¼ inch apart, so that the axial length of the coil 11 so formed is about 7 inches in the present example.

On the first and last turns of the coil 11 are connected a pair of 100-ohm carbon resistance thermometers 13 and 14, of any of the types well-known in the art, which are so characterized as to be suitable for the temperature range of liquid and solid hydrogen. The coil 11 is connected at each of its ends to stainless steel tubes 15 and 16 of like cross-sectional dimension, which pass out of the container 1 through the vacuum-jacketing tubes 8 and 9. The tube 15, jacketed by its vacuum covering 8, leads to a liquid helium storage reservoir 17. For the purposes of the present embodiment, this may comprise a spherical stainless steel inner container, jacketed in Dewar-type outer container of the general type disclosed, for example, in Figure 7.5 on page 224 of Cryogenic Engineering by Russell B. Scott, D. Van Nostrand Co., Inc., 1959. In the present embodiment the storage reservoir 17 has a capacity of 50 liters.

The liquid helium source 17 is disposed at a height, relative to the container 1, such that a pressure differential of one-to-four pounds is provided between the helium source 17, and the entrance to heat exchanger coil 11, so that the liquid helium is forced through the coil 11 and evaporates in a heat exchange with liquid hydrogen in the inner tube 7, causing the latter to freeze out on the inner walls of tube 7, as will be explained more fully hereinafter. The resulting helium vapor in coil 11 passes out through tube 16, to a system where it is exhausted to the atmosphere. A gauge 19a measures the pressure of the liquid helium as it passes from the reservoir 17.

Prior to closure of the cap 2, the container 1 is filled with 6 to 8 liters of liquid hydrogen to about 22 inches above the bottom.

The inner stainless steel tube 7 is equipped just above the top of the vacuum jacket 6 with four symmetrically spaced one inch diameter holes which permit entrance liquid hydrogen to come in contact with the inner heat transfer surface of the heat exchanger.

Mounted concentrically inside of the inner heat exchanger tube 7 is a rotatable scraper 21 which is shown in enlarged detail in FIGS. 3A and 3B. In the present illustration, this scraper element is formed of brass, although other metals suitable for low temperature use, and having a low coefficient of expansion for low temperature application, such as stainless steel, etc., may be used for this purpose.

In the present embodiment the screw scraper is mounted on a solid shaft 22 which is ¾ inch in diameter and terminates at its lower end in a pin 22a mounted in a brass bearing 23a which is supported by a strut about 2½ inches long and ¾ inch wide, bolted near its ends to the bottom of the annular vacuum jacket 6. Above the screw, the shaft 22 is a thin walled (.020 inch thick) stainless steel tube about 47 inches long, and is axially positioned in the container 1, passing out of the top 2 of container 1 through a neck 12a, ½ inch in inner diameter. A neoprene O ring 12b fitted into a recess on the inner surface of the neck 12a provides a gas-tight seal with the interior of the inner tube 7 of the heat exchanger.

At the lower end of the ¾ inch shaft 22 is an 11 inches long screw portion. This comprises a 95.7 inches long brass cutting edge 21a which is 9/16 inch thick, and which is helically wound around shaft 22 in edge-on fashion, with a spacing approximating 1½ turns per inch. The cutting blade 21a protrudes one-half inch outwardly from the cylindrical wall of the shaft 22. There is a separation of approximately one-half inch measured along the shaft, between adjacent windings of screw blade 21a. The outer periphery of the screw blade 21a is bevelled slightly inward, forming an angle of, say, 5° with the tube wall, and is machined to provide a clearance of 0.005 inch between the peripheral edge of the inner wall of heat exchanger tube 7. The bevelled outer periphery of the screw blade 21a is honed to a cutting edge.

The shaft 22 is coupled through a conventional system of gears 24 to the shaft of a variable speed motor 25. The latter may be of any of the forms well-known in the art. For present purposes, the motor 25 provides one-eighth horsepower at 80 revolutions per minute, and is operated from a 110 volt, 60 cycle source of power, drawing a current of about two amperes. The rate of rotation may be varied from 12 to 120 revolutions per minute.

In an alternative embodiment of the invention, the screw-form scraper element 21 is replaced in the combination shown in FIGS. 1 and 2A, 2B by a scraper element 25, which is shown in perspective and cross section in FIGS. 4A, 4B of the drawings. This comprises a plurality of blades 25a, 25b, 25c, and 25d in the form of laterally-projecting rakes, protruding outwardly from the central-shaft 22, so that as the shaft rotates, the blades of the scraper 25 bear against the inner surface of the inner heat exchanger tube 7. In the presently described embodiment, the four brass rake elements 25a, 25b, 25c, and 25d are soldered at diametrically opposite positions to the ¾ inch diameter brass shaft 22. Each of the aforesaid rake elements is formed from a rectangular brass plate into the outer edge of which teeth are formed. Each plate is disposed edgewise along shaft 22 at a position 90 degrees from the adjacent plates. In the present embodiment, each of the brass plates 25a, 25b, 25c, and 25d is 11 inches long, 1.89 inches wide, and ⅛ inch thick, and is milled so as to provide outwardly projecting rows of teeth 1/16 inch wide, ⅛ inch long, and spaced 1/16 inch from neighboring teeth. In addition, the teeth are so arranged that the space between the teeth on one arm is occupied by a tooth on the adjacent arm, whereby each section of the inner wall of heat exchanger tube 7 is scraped twice per revolution of the scraper. The total length of the cutting edge provided in each case is 21.5 inches.

Prior to operation, the resistance thermometers 13 and 14 are calibrated in boiling liquid nitrogen (77.4° Kelvin), boiling liquid hydrogen (20.2° Kelvin) at the triple point of hydrogen (13.8° Kelvin) and the boiling point of liquid helium (4.2° Kelvin).

Visual observations are possible, since the heat exchanger comprising the inner tube 7, surrounded by the copper coil 11 and enclosed in the vacuum jacket 6, is immersed in a liquid hydrogen bath contained in the unsilvered glass Dewar container 1, 1a surrounded by a double-walled outer jacket 4a, 4b, containing liquid nitrogen, which is also unsilvered.

Prior to beginning the slush hydrogen operation the following steps are taken:

(a) The refrigerant lines 15 and 16 are purged with gaseous helium.

(b) The vacuum jacket 6 and the connecting tubes 8 and 9 are connected to an exhaust pump of any of the types well-known in the art, and evacuated to a vacuum of the order of .001 millimeter of mercury. The glass container 1, which is later filled with liquid hydrogen, is first filled with liquid nitrogen, which is allowed to remain for a period of 30 minutes, for purposes of precooling.

(c) The liquid nitrogen is pumped out, and prior to the admission of liquid hydrogen, a stream of cold gaseous helium is permitted to flow at the rate of, say, ½ cubic feet per minute into the copper coil 11 of the heat exchanger comprising the inner tube 7.

(d) Rotation of shaft 22 is begun at the rate of 50 to 60 revolutions per minute.

(e) Container 1 is filled with liquid hydrogen to a lever 22 inches above the bottom. The interior of the container 1 is then pressurized with gaseous helium to a gauge pressure of between 1 and 2 pounds per square inch, a pressure which is maintained throughout the entire subsequent operation. The flow of liquid helium to the coil is then started, causing the cooling o fthe liquid hydrogen to commence. As soon as the hydrogen is cooled to the triple point, hydrogen begins to freeze onto the inner heat transfer surface of the inner heat exchanger tube 7.

Employing the apparatus described with reference to FIGS. 1 and 2 of the drawing, using a screw type scraper of substantially the form indicated in FIGS. 3A, 3B, the following results are obtained. The first solid particles exiting from the bottom of the inner heat exchanger tube 7 will be found to be crescent-shaped needles which conform in shape to the curvature of the inner surface of tube 7. However, as the liquid hydrogen is further cooled to the triple point, the nature of the solid abruptly changes, becoming of a snow-like consistency, in which the crystals have an approximate average cross section less than 1 to 3 millimeters.

The slush hydrogen produced in accordance with the present invention has been found to be a superior product to hydrogen slush produced by the methods and apparatus of the prior art. Compared to prior-art slush, the particles are smaller, and the density is greater, about 0.087 gram per cubic centimeter for the solid, at the triple point. Thus, the product slush is characterized by more mass per volume and, therefore, provides more useful refrigeration capacity. Moreover, the hydrogen slush produced by the techniques of the present invention has been found to be more fluid, which eliminates the necessity for aging.

Substituting the rake-type scraper shown in FIGS. 4A, 4B for the screw-type, the particles of solid hydrogen produced are found to be substantially similar to those produced with the screw-type scraper, the principal difference being that the screw-type scraper produces a pumping action not realized with the rake-type device.

It will be apparent to those skilled in the art that practice of the present invention is not limited to any specific forms of apparatus or system or to any specific process steps disclosed herein by way of illustration, or to the specific materials or refrigerants employed in the disclosed examples. Moreover, it will be apparent to those skilled in the art that in addition to the formation of slush hydrogen, the principles of the present invention can be applied to the formation of slush from other cryogenic fluids, such as, for example, fluorine, methane, and oxygen.

The scope of the invention is defined by the appended claims.

What is claimed is:

1. In a cryogenic system, a device for forming slush hydrogen as an end product from a supply of liquid hydrogen which comprises in combination: a sealed inner vessel containing liquid hydrogen, heat exchanger means in said inner vessel comprising a vacuum insulated jacket and an inner chamber having an annular inner heat transfer surface, said inner chamber including at least one opening allowing fluid communication between said inner vessel and said inner chamber, refrigeration means comprising vacuum jacketed conduit means for circulating a stream of low temperature helium in heat exchange relationship with said annular inner heat transfer surface to cool said inner heat transfer surface to a temperature below the triple point temperature of said liquid hydrogen, whereby an annular frozen layer of hydrogen forms on said heat transfer surface, mechanical means comprising an elongated shaft concentric with said annular surface and having scraping means thereon associated with said inner chamber including said heat transfer surface to loosen particles from said annular frozen layer and means for collecting the slush formed by an aggregation of said particles, an insulating jacket at least partly surrounding said inner vessel and providing an evacuated space therebetween, a further insulating jacket at least partly surrounding said first insulating jacket, said further insulating jacket containing liquid nitrogen, said further insulating jacket being vacuum jacketed and means for pressurizing said inner vessel and said inner chamber with gaseous helium to maintain the pressure therein at or above ambient pressure during the operation of the system.

2. The combination in accordance with claim 1 wherein said mechanical scraping means comprises a screw rotatably mounted in said inner chamber, including said shaft and a blade helically wound around said shaft, and means for driving said screw to rotate.

3. The combination in accordance with claim 1 wherein said mechanical scraping means comprises said shaft rotatably mounted within said chamber, said shaft having connected thereto in longitudinal alignment along said shaft a plurality of laterally projecting toothed blades, means for driving said shaft to rotate, whereby said respective blades periodically contact different portions of said frozen layer, and means for driving said shaft to rotate.

References Cited

UNITED STATES PATENTS

| | | | |
|---|---|---|---|
| 2,512,040 | 6/1950 | Slobod | 62—12 |
| 2,895,303 | 7/1959 | Streeter | 62—12 |
| 2,909,903 | 10/1959 | Zimmermann | 62—40 |
| 3,116,427 | 12/1963 | Giaever | 62—40 |
| 3,235,002 | 2/1966 | Bevarly et al. | 165—94 |
| 3,319,436 | 5/1967 | Wilch | 62—354 |
| 3,354,662 | 11/1967 | Daunt | 62—10 |
| 2,902,839 | 9/1959 | Marshall | 62—354 |
| 3,230,737 | 1/1966 | Lunde | 62—354 |

OTHER REFERENCES

"Advances In Cryogenic Engineering," volume 11, Plenum Press, New York, 1966, K. D. Timmerhaus, pp. 202–206 relied on.

WILBUR L. BASCOMB, JR., Primary Examiner

U.S. Cl. X.R.

62—10, 35, 40, 354